United States Patent
Bornschein et al.

(10) Patent No.: US 9,513,457 B2
(45) Date of Patent: Dec. 6, 2016

(54) LENS MOUNT WITH INTERMEDIATE RING

(71) Applicant: JENOPTIK Optical Systems GmbH, Jena (DE)

(72) Inventors: Marco Bornschein, Jena (DE); Torsten Erbe, Jena (DE)

(73) Assignee: JENOPTIK Optical Systems GmbH, Jena (DE)

(*) Notice: Subject to any disclaimer, the term of this patent is extended or adjusted under 35 U.S.C. 154(b) by 0 days.

(21) Appl. No.: 14/799,919

(22) Filed: Jul. 15, 2015

(65) Prior Publication Data
US 2016/0018620 A1     Jan. 21, 2016

(30) Foreign Application Priority Data
Jul. 15, 2014     (DE) .................. 10 2014 109 912

(51) Int. Cl.
*G02B 7/02*     (2006.01)

(52) U.S. Cl.
CPC .................. *G02B 7/026* (2013.01)

(58) Field of Classification Search
USPC .............................. 359/694–704, 811–830
See application file for complete search history.

(56) References Cited

U.S. PATENT DOCUMENTS

| | | | | |
|---|---|---|---|---|
| 5,765,047 A * | 6/1998 | Miyamoto | ............. | G03B 13/12 396/149 |
| 2011/0013296 A1* | 1/2011 | Kazahaya | ............. | G02B 7/08 359/819 |

FOREIGN PATENT DOCUMENTS

| | | |
|---|---|---|
| DE | 196 23 418 A1 | 12/1997 |
| DE | 100 30 004 A1 | 12/2001 |
| DE | 103 42 269 A1 | 4/2005 |
| JP | 2008 261985 A | 10/2008 |

OTHER PUBLICATIONS

Textbook—Device Construction [Gerate-Konstruktion]; Werner Krause, ed. VEB Verlag Technik Berlin, 1st Edition 1982; 482-483, 539-552, Dec.

* cited by examiner

*Primary Examiner* — Mohammed Hasan
(74) *Attorney, Agent, or Firm* — Duane Morris LLP

(57) ABSTRACT

A lens mount with a mount ring (1) having a mount ring axis (1.1), at which mount ring (1) is provided an edge support (1.2) which is radially extended with respect to the mount ring axis (1.1), with a round optical component (2) which contacts the edge support (1.2) by an end face and with an intermediate ring (3) which contacts the other end face of the optical component (2) and which is fixed in position opposite the mount ring (1), e.g., by means of a screw ring (4.1). Three point-shaped first protuberances (1.3) and second protuberances (3.3), respectively, are provided at the edge support (1.2) and at the intermediate ring (3) in each instance on an imaginary circular ring (1.4) of identical size at angular distances relative to one another, and one each of the first protuberances (1.3) and one each of the second protuberances (3.3) lie in each instance on an imaginary straight line (5) running parallel to the mount ring axis (1.1) through the edge region (2.2).

9 Claims, 3 Drawing Sheets

LENS MOUNT WITH INTERMEDIATE RING

RELATED APPLICATIONS

The present application claims priority benefit of German Application No. DE 10 2014 109 912.5 filed on Jul. 15, 2014, the contents of which is incorporated by reference in their entirety.

BACKGROUND OF INVENTION

Lens mounts serve for precise, mechanical holding of optical single lenses or of a plurality of lenses which are bonded together, otherwise known as cemented groups (referred to hereinafter collectively as round optical components), in exact positions within a lens system, i.e., with a determined spacing and alignment relative to one another. However, particularly in high-power objectives, even slight positional deviations of individual lenses of the lens system can lead to unwanted system errors.

In objectives in which round optical components without mounts are arranged relative to one another directly inside an objective tube, also known as tube or nested-cell mount, the objective tube together with the means by which a round optical component is held therein can be considered as a lens mount within the meaning of the invention.

However, the round optical components can also be mounted directly in individual auxiliary mounts with mount rings, and the auxiliary mounts can be arranged relative to one another, e.g., inside a shared housing which can also be an objective tube. An auxiliary mount of this kind can also be a lens mount within the meaning of the invention.

Frequently, a round optical component is axially fixed within an objective tube or mount ring, both of which are referred to hereinafter as mount ring, in that the optical component is placed with one end face against an annular edge support formed in the mount ring and a screw ring which is screwed together with the mount ring is adjusted to the other end face.

In this regard, in the textbook "Device Construction [Gerätekonstruktion]" (Werner Krause, ed., VEB Verlag Technik Berlin, 1st edition (1982), page 482, last paragraph, to top of page 483), it is stated under the heading "Mount with screw ring, screw cap" that mounting with screw rings, especially with slotted screw rings, is the commonest way of securing round optical components. In all of the arrangements shown in this reference, the round optical components contact an edge support of a mount ring by one end face annularly in a planar manner, while there is annular line contact between the screw ring and the other end face of the optical component.

The advantage in this type of mounting of round optical components resides in the simple assembly in which the optical component is placed against an edge region of a mount ring axially in a frictionally engaging manner and in the simple production of the mount parts required for mounting, namely, a mount ring and a screw ring. This results in a cementless, economical lens mount.

It is disadvantageous that stresses are introduced into the optical component which grow as the tightening force of the screw ring increases toward the mount ring. This results in birefringences in the optical component which negatively affect its imaging quality.

Beyond this, this type of lens mount is not temperature-compensated so that temperature fluctuations lead to undefined radial changes in position of the optical component in the mount ring because of the different coefficients of expansion of the material of the optical component and mount parts. Therefore, it is not suitable for high-power objectives which must maintain consistent imaging quality over a given temperature range.

Further, a lens mount with a three-point contact on both sides and a slotted screw ring is known from the above-cited textbook.

A self-centering holder for a mounted lens is described in Laid Open Application DE 196 23 418 A1. The lens lies directly on the lens mount at three contact points and is nondetachably connected to the lens mount by adhesive. The mounted lens is elastically supported in a sleeve to absorb radially acting forces. Further steps for axial support are not described.

Laid Open Application DE 100 30 004 A1 describes an apparatus for supporting an optical element. The support takes place at polished support points in the edge region of the optical element on three bearing bodies with spherical surface. For purposes of exact positioning and reproducible support of the optical element, one of the three support points is planar, one is grooved and one is conical. The support on the bearing bodies is secured by means of securing devices which contact the opposite side of the support points without force.

In an optical holder described in Laid Open Application JP 2008 261 985 A, the axial support of the optics is effected via three bearing elements which are received at an axial surface of the holder so as to be spaced apart by 120°. The bearing elements are balls having a flattened location on which the optics lie. The balls are supported in the holder at the edges of bores which are smaller than the ball diameter. The optics are secured in the same manner, the flattened balls being arranged in bores of a respective holding element which is screwed to the holder and secured in position. The clamping force between two respective bearing elements is adjusted by the screwed-on holding element.

A low-stress optics mount having a mount ring and a spring ring is known from Laid Open Application DE 103 42 269 A1. The radial mounting of the optics is carried out with no clearance or pressing at an inner lateral surface of the mount ring. The axial mounting is carried out at three axial stops of the mount ring which are spaced apart at 120° so as to be operative only at three points. The optics are secured in the mount ring with the three-point spring ring which rests on the optics in the edge region by three pressure surfaces opposite the axial stops. The spring force is adjustable.

SUMMARY OF THE DISCLOSURE

It is an object of the invention to provide a simple, low-stress lens mount in which a round optical component is fixed at an edge region in a mount ring by frictional engagement and is held in a positionally stable manner even during changes in temperature within a given temperature range.

For a lens mount with a mount ring having a mount ring axis, at which mount ring is provided an edge support which is radially extended with respect to the mount ring axis, with a round optical component which contacts the edge support and which has a cylindrical circumferential surface, and with a pressure ring by means of which the optical component abuts the edge support with a pressing force, the above-stated object is met through the following steps:

The optical component has, adjoining its circumferential surface, an edge region which is planar on two sides and which is located outside of the optically active volume of the optical component. Therefore, stresses which may possibly arise only in the edge region do not influence the optical imaging quality of the optical component.

Three point-shaped first protuberances are provided at the edge support on an imaginary circular ring at an angular distance from one another, the optical component contacting these first protuberances by one side.

Contacting the other side of the optical component is an intermediate ring which has three point-shaped second protuberances on a front side facing the optical component and which is arranged between the optical component and the pressure ring in a predefined rotational position such that one each of the first protuberances and one each of the second protuberances lie in each instance on an imaginary straight line running parallel to the mount ring axis through the edge region. The contact pressing force, divided into three component forces, acts along the imaginary straight lines indirectly via the edge region of the optical component between one of the first protuberances and one of the second protuberances in each instance.

As regards the thermal behavior of the lens mount, it is key that one of the second protuberances is axially stiffer than the other second protuberances. In this way, the amount of the component force acting along the imaginary straight lines through the stiffer of the second protuberances is greater than the amounts of the respective component forces acting along the other imaginary straight lines. The optical component is then always held at this stiffer second protuberance and, with a different expansion behavior than the mount ring and intermediate ring which are preferably fashioned from an identical material, can slide along the comparatively softer second protuberances.

Anti-rotation means, devices or elements, are advantageously provided at the intermediate ring so as to ensure a defined rotational position of the intermediate ring within the mount ring.

Particularly for purposes of visual recognition of the stiffer of the second protuberances, which can be advantageous for assembly of the lens mount, the amount of the angular spacing between the second protuberances and, consequently, also between the first protuberances is advantageously unequal. Accordingly, the amount of angular distance between two of the first protuberances is not equal to 120° and the amounts of the other angular distances are equal. The second protuberance enclosed by the angular distances of identical amount is stiffer than the other second protuberances.

For a defined radial contact of the optical component in the mount ring, there is advantageously provided in the mount ring a groove which extends in axial direction and which forms two groove edges, this groove being contacted by the circumferential surface of the optical component so as to form two line contacts with the mount ring.

When the lens mount has the groove formed in the mount ring and when one of the second protuberances is constructed to be stiffer, then the latter is advantageously arranged relative to the groove such that the imaginary straight line running through it extends through the groove.

The pressure ring can advantageously be constructed as a screw ring which is screwed to the mount ring axially inward or axially outward thereof.

Alternatively, the pressure ring can be a circlip or a retaining ring which is inserted in an annular groove provided in the mount ring.

The edge support is advantageously formed by an annular shoulder or by three ring segment-shaped projections.

BRIEF DESCRIPTION OF THE DRAWINGS

The lens mount according to the invention will be described more fully in the following with reference to embodiment examples in conjunction with the drawings. The drawings show.

DESCRIPTION OF THE EMBODIMENTS

Figure 4:
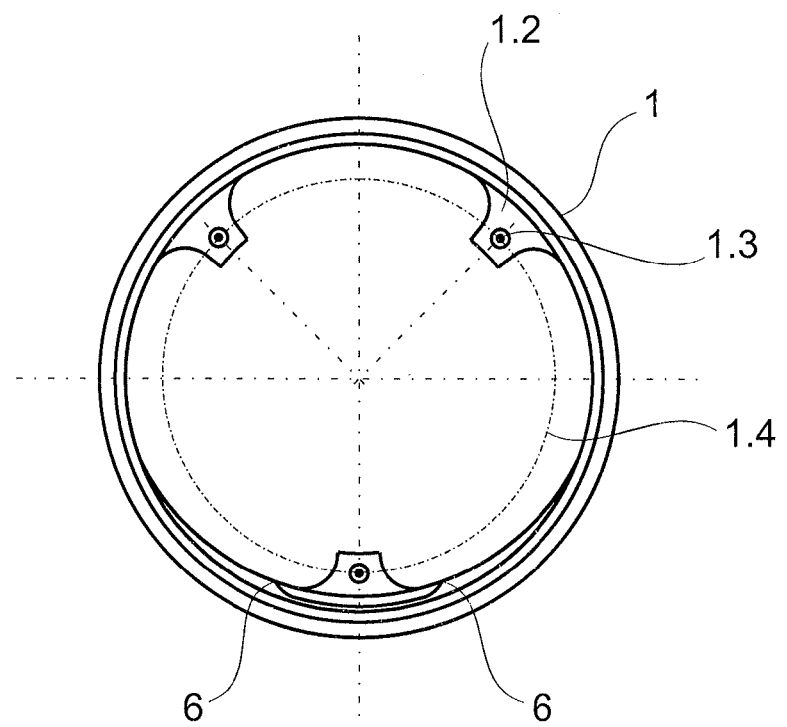
FIG. 4 shows a mount ring with an edge support formed by three ring segment-shaped projections.

In common with the prior art, all of the embodiment examples of a lens mount according to the invention have a mount ring 1 with a mount ring axis 1.1, an edge support 1.2 that is radially extended relative to the mount ring axis 1.1 for axial support of a round optical component 2 and an intermediate ring 3 and a pressure ring 4. The edge support 1.2 can be formed by a closed annular surface at an annular shoulder as is shown in FIG. 1 or by ring segments at three ring segment-shaped projections as is shown in FIG. 4.

Embodiments of the invention include intermediate ring 3, the construction thereof and the construction of the optical component 2 and edge support 1.2, by means of which, in contrast to the prior art, the optical component 2 is held axially via three points and, accordingly, with respect to a plane formed through these points perpendicular to the optical axis, not in an overdetermined manner. In an advantageous manner, it is further held radially via two further points, and the connecting line between the latter does not extend through the optical axis.

Figure 1:
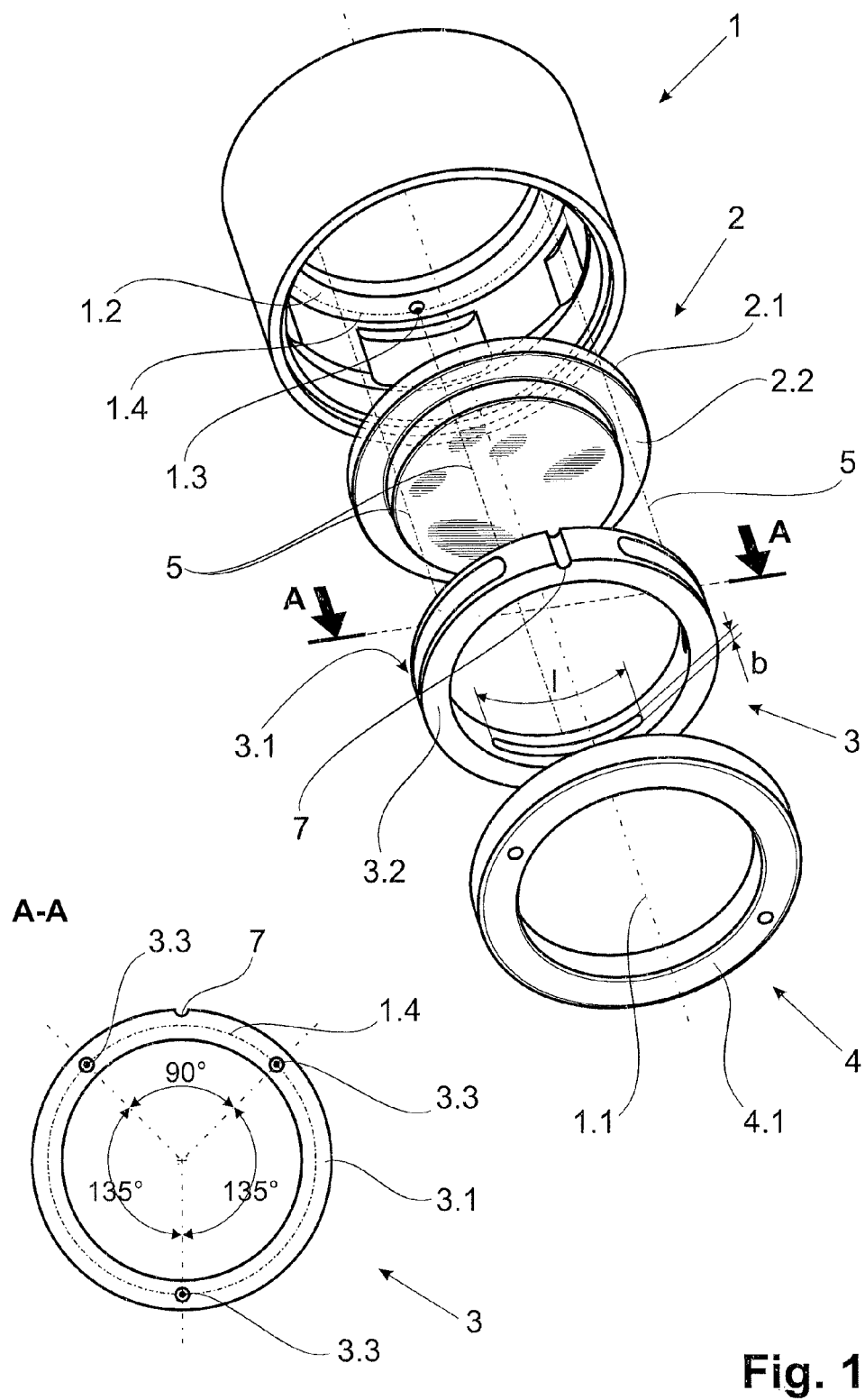
FIG. 1 is an exploded view of a lens mount with a pressure ring constructed as screw ring and a mount ring with an edge support formed by an annular shoulder.

FIG. 1 shows a first embodiment example of a lens mount in an exploded view. The mount ring 1, optical component 2, intermediate ring 3 and pressure ring 4 which is constructed as a screw ring 4.1 are arranged together on the axis of symmetry of the mount ring 1, namely, the mount ring axis 1.1, i.e., the axes of symmetry thereof coincide with that of the mount ring 1. The screw ring 4.1 can be screwed to the mount ring 1 via an external thread or an internal thread.

Adjoining its cylindrical circumferential surface 2.1, the optical component 2 has an edge region 2.2 which is planar on both end sides and perpendicular to the optical axis. This edge region 2.2 surrounds the optically active volume and makes no contribution to the optical imaging of a beam guided through the optical component 2. Regardless of the surface curvature of the two faces of the optical component 2 which can be flat, concave or convex as determined by its optical function, the edge region 2.2 is flat on both sides; that is, the edge region 2.2 is formed by two advantageously identical annular surfaces which are parallel to one another. Accordingly, the edge region 2.2 has a constant edge thickness.

Three point-shaped first protuberances 1.3 are provided at angular distances from one another on an imaginary circular ring 1.4 at the edge support 1.2 formed in the mount ring 1. As will be apparent, the angular distances are identical and are accordingly offset relative to one another by 120°. However, the angular distances may also diverge from this as will be described later. The first protuberances 1.3 are as stiff as possible axially and define a radial plane in which the optical component 2 abuts and is held.

The intermediate ring 3 has on a front side 3.1 facing the optical component 2 three point-shaped second protuberances 3.3 with the same angular distances relative to one another as the first protuberances 1.3 and is arranged between the optical component 2 and the screw ring 4.1 in a given rotational position such that one each of the first protuberances 1.3 and one each of the second protuberances 3.3 lie in each instance on an imaginary straight line 5 running through the edge region 2.2.

An anti-rotation device 7 is provided so that the intermediate ring 3 remains in the predefined rotational position during the assembly of the lens mount, namely, when tightening the screw ring 4.1. As is indicated in FIG. 1, the anti-rotation device 7 may be formed by a groove in the intermediate ring 3 in conjunction with a spring provided in the mount ring 1 and can accordingly also ensure that the intermediate ring 3 is inserted in a defined manner into the mount ring 1 in the predetermined rotational position. Alternatively, a groove in the mount ring 1 and a corresponding spring which is guided in this groove so as to be supported in the intermediate ring 3 are conceivable.

The intermediate ring 3 is preferably slit below the second protuberances 3.3 as can be seen in FIG. 1 so that it is axially elastic in the region of the second protuberances 3.3. In this regard, the elasticity can be varied over the slit length 1 and the slit width b of the slit so that the pressing force which is caused by tightening the screw ring 4.1 on the intermediate ring 3 can be transmitted in direction of the imaginary straight lines 5 to the optical component 2 so as to act on the first protuberances 1.3 as component forces of different magnitude. In this way, the axial stiffness of the second protuberances 3.3 can be influenced and also adjusted differently relative to one another. In contrast to the first protuberances 1.3 which are advantageously configured to be as stiff as possible, the second protuberances 3.3 are configured to be comparatively less stiff and advantageously only sufficiently stiff that the optical component 2 is held stiffly between the respective opposed protuberances 1.3, 3.3.

One of the second protuberances 3.3 is configured to be axially stiffer than the other second protuberances 3.3 so that the amount of the component force acting along the imaginary straight line 5 running through this stiffer second protuberance is greater than the sum of the amounts of the respective component forces of the pressing force which act along the other imaginary straight lines 5.

In case a thermally induced expansion behavior of the optical component 2 differs compared to the mount ring 1 and the intermediate ring 3, the optical component 2 is held at the stiffer of the second protuberances 3.3 and can slide radially at the softer of the second protuberances 3.3 and accordingly compensate for expansion differences between the materials employed for the mount ring 1 and/or intermediate ring 3 and the optical component 2. The radial relative position of the optical component 2 within the mount ring 1 accordingly remains constant with respect to the stiffer of the second protuberances 3.3. In other words, a radial bearing retention is carried out by means of the frictional forces which oppose the sliding and which act differently between the first protuberances 1.3 and second protuberances 3.3.

Particularly when the second protuberances 3.3 are formed monolithically at the intermediate ring 3, a differentiated stiffness of the second protuberances 3.3 can be achieved through constructional steps, e.g., slits or narrowed portions, which locally modify the cross section of the intermediate ring 3. A differentiated stiffness can also be achieved when the second protuberances 3.3 are arranged at the intermediate ring 3 as discrete individual parts, e.g., in the form of half-spheres and comprising different material.

The intermediate ring 3 can have further protuberances on a front side 3.2 remote of the optical component 2. These further protuberances can, but need not, lie on the imaginary straight lines 5. These further protuberances are advantageous for a defined contact of the screw ring 4.1.

The amount of angular distance between two respective adjacent first protuberances 1.3 and second protuberances 3.3, respectively, may be identical but may also differ.

Figure 2:
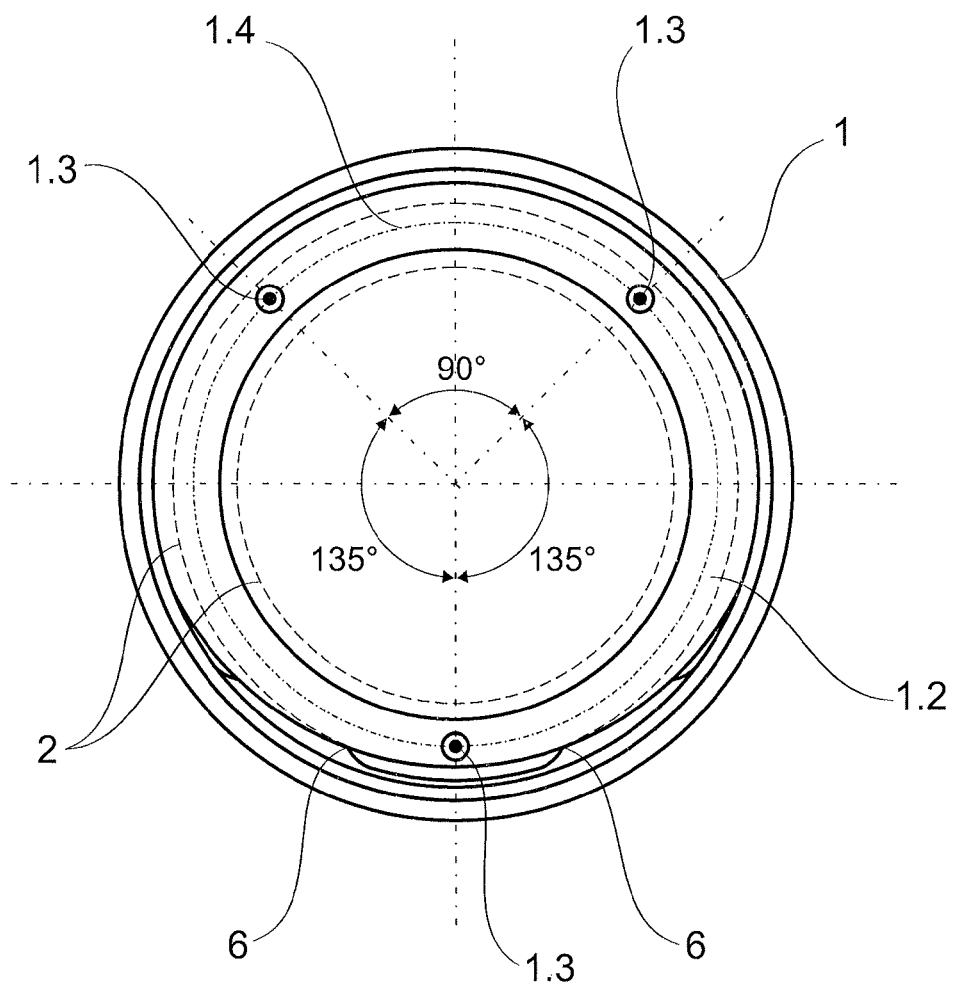
FIG. 2 is a top view of an optical component inserted in a mount ring.

As is shown in FIG. 2, the amount of the angular distances between two of the first protuberances 1.3 is not equal to 120° and is preferably less than 140° and greater than 70°. The amounts of the other angular distances are identical. The second protuberance 3.3 which is enclosed by the angular distances of equal amount is stiffer than the other second protuberances 3.3. The advantage consists particularly in that even when the geometry and dimensioning of the first protuberances 1.3 and second protuberances 3.3 are identical, the stiffer of the second protuberances 3.3 is visually recognized. This facilitates the insertion of the intermediate ring 3 into the mount ring 1 in the correct rotational position when assembling the lens mount.

In combination with second protuberances 3.3 of differentiated stiffness, the optical component 2 can be held in a radially defined manner when a groove extending in axial direction and having two groove edges 6 is provided in the mount ring 1 above the edge support 1.2, this groove being contacted by the circumferential surface 2.1 of the optical component 2 so as to form two line contacts with the mount ring 1. The stiffer second protuberance 3.3 of the second protuberances 3.3, if any, advantageously lies between the groove edges 6. FIG. 2 shows this arrangement of the mount ring 1.

The pressure ring 4 can take the place of a screw ring 4.1 as a ring with threaded bores which are distributed along the circumference and into which screws can extend through the mount ring 1.

Figure 3:
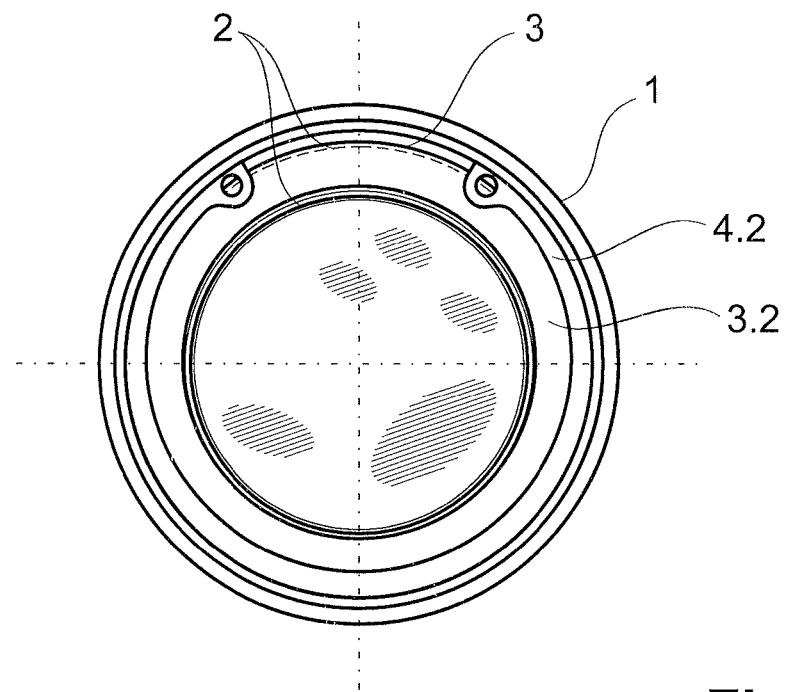
FIG. 3 shows a lens mount with a pressure ring constructed as a retaining ring.

Alternatively, the pressure ring 4 can be constructed, e.g., as a circlip or a retaining ring 4.2 which, as is shown in FIG. 3, is snapped into an annular groove provided for this purpose in the mount ring 1. In this case too, the pressing forces cannot be influenced.

In contrast to a screw ring 4.1, the pressing force cannot be adjusted in the other embodiments of the pressure ring 4.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS 1 mount ring
1.1 mount ring axis
1.2 edge support
1.3 first protuberance
1.4 imaginary circular ring
2 optical component
2.1 circumferential surface 2.2 edge region
3 intermediate ring
3.1 side facing the optical component 2
3.2 side remote of the optical component 2
3.3 second protuberance
4 pressure ring
4.1 screw ring
4.2 retaining ring
5 imaginary straight line
6 groove edge
7 anti-rotation device
l slit length
b slit width

What is claimed is:

1. A lens mount with a mount ring having a mount ring axis, comprising an edge support provided at said mount ring, said edge support being radially extended with respect to the mount ring axis, a round optical component in contact with the edge support, said optical component having a cylindrical circumferential surface and a pressure ring by means of which the optical component abuts the edge support with a pressing force, three point-shaped first protuberances provided at the edge support on an imaginary circular ring at angular distances relative to one another, an intermediate ring arranged in a predetermined rotational position between the optical component and the pressure ring, and the mount ring, the optical component, the intermediate ring and the pressure ring being arranged together on the mount ring axis, an edge region of said optical component adjoining the circumferential surface, said edge region being planar on two sides, said intermediate ring having three point-shaped second protuberances on a front side facing the optical component such that one each of the first protuberances and one each of the second protuberances lie in each instance on an imaginary straight line running parallel to the mount ring axis through the edge region, and the contact pressing force divided into three component forces acts along said imaginary straight line, one of said second protuberances being axially stiffer than the other second protuberances so that the amount of the component force acting along the imaginary straight line through the stiffer of the second protuberances is greater than the amounts of the respective component forces acting along the other imaginary straight lines.

2. The lens mount according to claim 1, further comprising anti-rotation means provided at the intermediate ring to ensure a defined rotational position of the intermediate ring within the mount ring.

3. The lens mount according to claim 1, wherein said pressure ring is a screw ring which is screwed to the mount ring axially inward or axially outward thereof.

4. The lens mount according to claim 1, wherein said pressure ring is a circlip or a retaining ring which is inserted in an annular groove provided in the mount ring.

5. The lens mount according to claim 1, wherein said edge support is formed by an annular shoulder.

6. The lens mount according to claim 1, wherein said edge support is formed by three ring segment-shaped projections.

7. A lens mount with a mount ring having a mount ring axis, comprising an edge support provided at said mount ring, said edge support being radially extended with respect to the mount ring axis, a round optical component in contact with the edge support, said optical component having a cylindrical circumferential surface and a pressure ring by means of which the optical component abuts the edge support with a pressing force, three point-shaped first protuberances provided at the edge support on an imaginary circular ring at angular distances relative to one another, an intermediate ring arranged in a predetermined rotational position between the optical component and the pressure ring, an edge region of said optical component adjoining the circumferential surface, said edge region being planar on two sides, said intermediate ring having three point-shaped second protuberances on a front side facing the optical component such that one each of the first protuberances and one each of the second protuberances lie in each instance on an imaginary straight line running parallel to the mount ring axis through the edge region, and the contact pressing force divided into three component forces acts along said imaginary straight line, one of said second protuberances being axially stiffer than the other second protuberances so that the amount of the component force acting along the imaginary straight line through the stiffer of the second protuberances is greater than the amounts of the respective component forces acting along the other imaginary straight lines, and the amount of angular distance between two of the first protuberances is not equal to 120° and the amounts of the other angular distances are equal, and wherein the second protuberance enclosed by the angular distances of identical amount is stiffer than the other second protuberances.

8. The lens mount according to claim 1, further comprising a groove which extends in an axial direction and which forms two groove edges, said groove being contacted by the circumferential surface of the optical component so as to form two line contacts with the mount ring so that the optical component occupies a radially defined position in the mount ring.

9. The lens mount according to claim 8, wherein said imaginary straight line runs through the groove on which the stiffer second protuberance lies.

* * * * *